Oct. 28, 1941.  L. O. CARLSEN  2,260,605
METHOD OF AND APPARATUS FOR CUTTING GEARS
Filed March 10, 1937  11 Sheets-Sheet 1

Fig. 1

Inventor
Leonard O. Carlsen
B. E. Schlesinger
his Attorney

Oct. 28, 1941.  L. O. CARLSEN  2,260,605
METHOD OF AND APPARATUS FOR CUTTING GEARS
Filed March 10, 1937   11 Sheets-Sheet 3

Inventor
Leonard O. Carlsen
By
B. H. Schlesinger
his Attorney

Inventor
Leonard O. Carlsen
BF Schlesinger
His Attorney

Inventor
Leonard O. Carlsen
His Attorney

Oct. 28, 1941.  L. O. CARLSEN  2,260,605
METHOD OF AND APPARATUS FOR CUTTING GEARS
Filed March 10, 1937  11 Sheets-Sheet 6

Inventor
Leonard O. Carlsen
By B. Schlesinger
his Attorney

Oct. 28, 1941.　　　L. O. CARLSEN　　　2,260,605
METHOD OF AND APPARATUS FOR CUTTING GEARS
Filed March 10, 1937　　　11 Sheets-Sheet 7
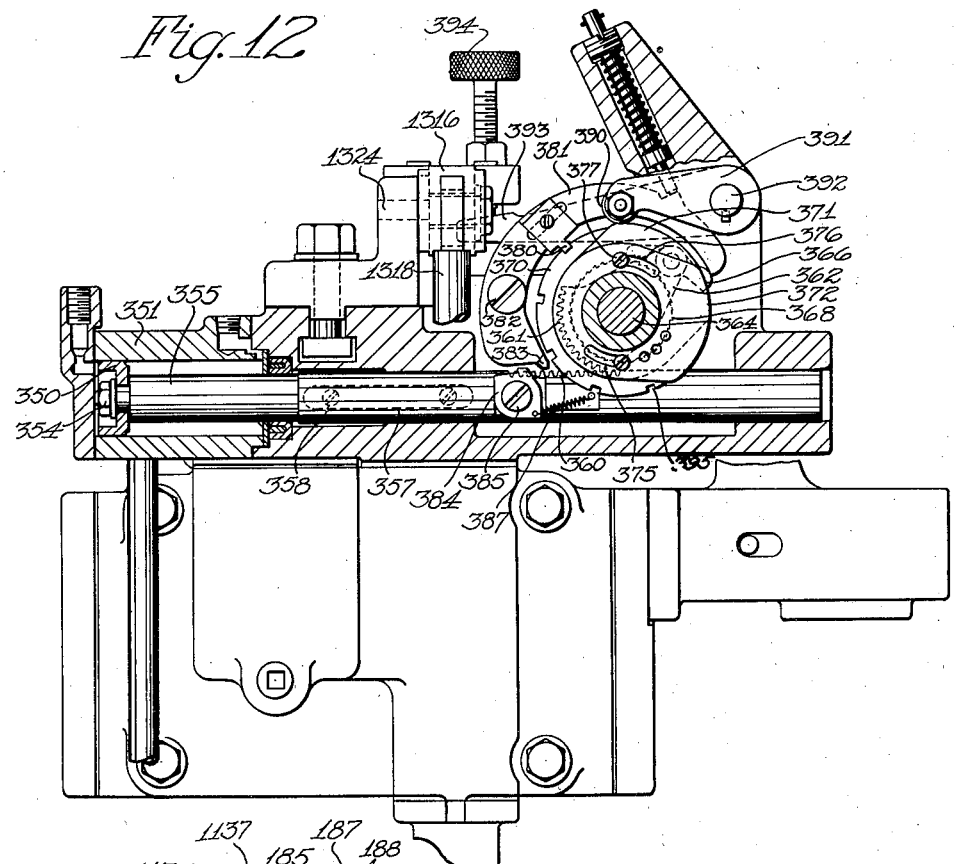
Inventor
Leonard O. Carlsen
By
B. Schlesinger
His Attorney Oct. 28, 1941.    L. O. CARLSEN    2,260,605
METHOD OF AND APPARATUS FOR CUTTING GEARS
Filed March 10, 1937    11 Sheets-Sheet 8

Inventor
Leonard O. Carlsen
B. Schlesinger
his Attorney

Oct. 28, 1941.  L. O. CARLSEN  2,260,605
METHOD OF AND APPARATUS FOR CUTTING GEARS
Filed March 10, 1937　　11 Sheets-Sheet 9
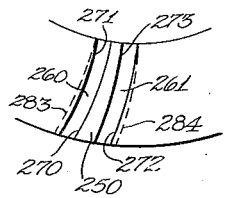
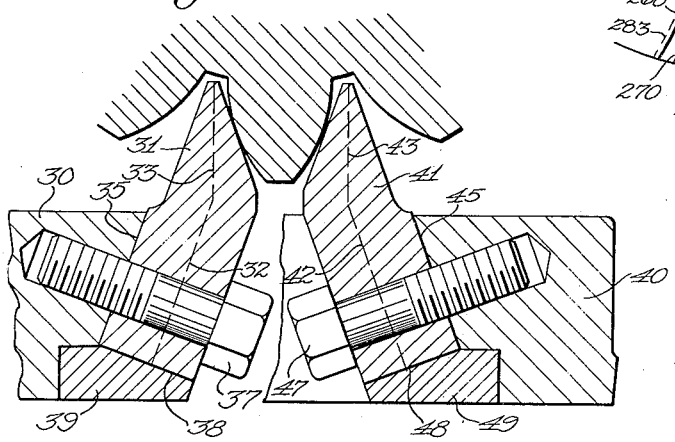
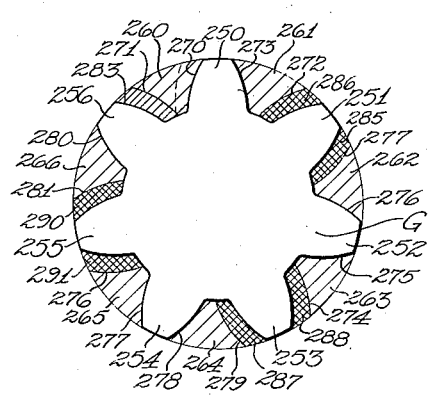
Fig. 16
Fig. 17
Fig. 18
Fig. 19
Inventor
Leonard O. Carlsen
his Attorney Oct. 28, 1941.  L. O. CARLSEN  2,260,605
METHOD OF AND APPARATUS FOR CUTTING GEARS
Filed March 10, 1937  11 Sheets-Sheet 11

Inventor
Leonard O. Carlsen
By
B. T. Schlesinger
his Attorney

Patented Oct. 28, 1941

2,260,605

UNITED STATES PATENT OFFICE 2,260,605

METHOD OF AND APPARATUS FOR CUTTING GEARS

Leonard O. Carlsen, Rochester, N. Y., assignor to Gleason Works, Rochester, N. Y., a corporation of New York Application March 10, 1937, Serial No. 130,140

25 Claims. (Cl. 90—5)

The present invention relates to a method and to apparatus for cutting gears and particularly to a method and to apparatus for cutting longitudinally curved tooth bevel and hypoid gears.

A primary object of the present invention is to provide a method and machine for cutting and particularly rough-cutting spiral bevel and hypoid gears which will be capable of much faster production than any such machine previously built.

Another object of the invention is to provide a tapered gear cutting machine in which a pair of cutting tools are employed that are adapted to operate simultaneously in different tooth spaces of a gear blank and first cut slots of uniform lengthwise width in all the tooth spaces of the blank and then re-cut these slots in a second revolution of the blank to widen them out and give them the lengthwise taper in width desirable in tapered gearing.

Still another object of the invention is to provide a method and machine for cutting tapered gears in which the desired lengthwise taper in width of the gear tooth spaces may be produced by a pair of eccentrically mounted face-mill gear cutters and in which the cutters are arranged to operate in different tooth spaces of the blank simultaneously, but in which the work performed by the two cutters is divided substantially equally between them throughout the whole cutting operation upon the gear blank.

A further object of the invention is to provide a method for indexing a gear blank during the cutting of teeth therein, so that substantially equal amounts of stock will be removed by each of two cutting tools throughout the cutting operations on the gear whether the gear is to have an odd or an even number of teeth.

A further object of the invention is to provide a gear cutting machine on which the gear blank to be cut may be indexed from tooth space to tooth space or through a multiple number of tooth spaces at any given indexing operation and in which the indexing mechanism is regulable so as to permit the space to space indexing to occur in any predetermined relation to the multiple space indexing.

A further object of the invention is to provide a gear cutting machine of the character described in which a pair of cutting tools are employed that are adapted to operate simultaneously in different tooth spaces of a gear blank and in which the rate of operation of the machine is speeded up after the cutters have slotted out all of the tooth spaces of the blank and when they are taking the taper-cuts in such spaces.

Still another object of the invention is to provide a gear cutting machine which has mechanism that is advanced step-by-step in time with the index mechanism and which will cause the work to be withdrawn from operative to loading position when the cutting operation upon the gear blank has been completed.

A further object of the invention is to provide a machine for cutting tapered gears with a pair of eccentrically mounted face-mill cutters in which adjustments are provided for varying the distance between the two cutters at the point of cut, taking up wear on the cutters, and so forth, and in which a single drive member is employed to drive the two cutters.

Still another object of the invention is to provide an improved form of face-mill gear cutter, preferably for use in the improved machine and process of the present invention in which the cutting blades or teeth may be very securely held.

Other objects of the invention will be apparent hereinafter from the specification and from the recital of the appended claims.

The invention comprises, among other things, an improvement upon the gear cutting machine illustrated in my Patent No. 2,114,627, of April 19, 1938, and the invention will be described in connection with the necessary modifications required in the machine of said patent in order to practice the present invention.

In the drawings:

Fig. 1 is a transverse sectional view looking at the cutter end of a machine built according to the principles of my prior invention, but modified in order to practice the present invention;

Fig. 11 is a fragmentary sectional view taken longitudinally of the work spindle of the machine and showing further details of the index mechanism;

Fig. 12 is a part-elevational, part-sectional view of the speed-up control mechanism of the machine;

Fig. 16 is a fragmentary sectional view on an enlarged scale illustrating the mode of operation of the cutters employed in the present invention;

Fig. 17 is a diagrammatic view, illustrating the process of cutting a gear according to the present invention;

Figs. 18 and 19 are diagrammatic views, further illustrating the process of cutting gears according to the present invention and showing, respectively, how a gear blank that is to have an odd number of teeth and a gear blank that is to have an even number of teeth may be indexed in order to secure the taper cut and at the same time distribute the work of cutting equally between the two cutters;

Figure 2:
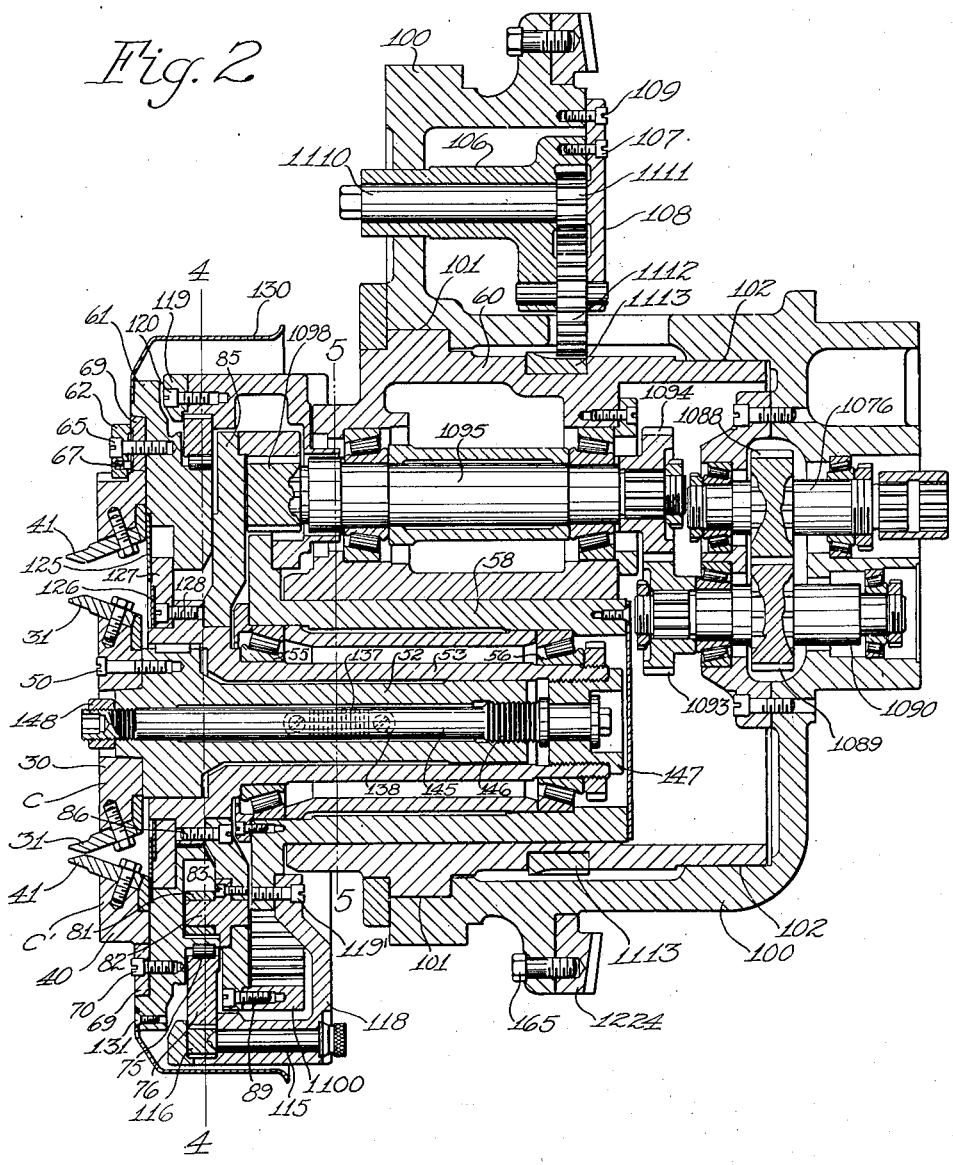
Fig. 2 is a horizontal sectional view through the portion of the machine shown in Fig. 1.

In the cutting process of the present invention, a pair of face-mill gear cutters are employed. These cutters are mounted eccentrically of one another and arranged so that they operate in different tooth slots of a gear blank simultaneously. One of the features of the present invention is the manner of indexing the work so that the two cutters will remove substantially equal amounts of stock during the cutting of a gear and the wear on the cutters will be approximately equal.

When a gear that has an odd number of teeth is to be cut, the work is indexed through the angular distance of two tooth spaces at each indexing operation. This means that the blank must be indexed through two revolutions in order to cut all of its teeth. However throughout the whole operation of cutting the gear, the two cutters will do equal amounts of work.

When an even number of teeth are to be cut, various methods of indexing may be employed. One method is to index the blank through the angular distance of two of its tooth spaces until the blank has made one revolution, then index the blank once through the angular distance of a single tooth space, and then resume the indexing through the angular distance of two tooth spaces until all of the teeth have been completed. Again, the indexing can be so arranged that the two cutters will do substantially equal amounts of work throughout the whole cutting operation.

On the first cut of each cutter in a tooth space, each cutter will naturally cut a slot of uniform width throughout its length. When the blank has been indexed to a point where one of the cutters cuts in a slot previously operated upon by the other cutter, the second cutter, because of the eccentric relation of the two cutters, will widen the slot and provide the desired taper in width from end to end of the tooth slot, which is desirable in a bevel or hypoid gear.

Attempts have been made previously to cut gears with two eccentrically mounted face-mill gear cutters but these have not been successful. In one such attempt, the two cutters were arranged to cut in different tooth spaces of the gear blank simultaneously but the blank was indexed through only one tooth space at a time. The gear was completed in one revolution, but the work done was divided very unequally between the two cutters. On the first cut, the two cutters cut into the solid metal of the blank, cutting slots of uniform width in two different tooth spaces. Thereafter, however, only the leading cutter cut into solid metal. The other cutter simply widened out the slot produced by the first cutter. Hence, the burden fell unequally on the two cutters and one cutter became dull much sooner than the other. Thus, repeated shut-downs of the machine for replacement of cutters were necessary and the process did not prove practical.

In another attempt, the cutters were mounted to operate in the same tooth slot simultaneously. However, such cutters had to have an interlocking relation between their cutting blades and this reduced materially the number of blades that might be employed in any one cutter and required very careful and accurate timed rotation of the two cutters. By arranging the cutters to operate in two different tooth spaces simultaneously, as with the present invention, the cutters may rotate independently of one another and no accurate timing of their rotation is required and in addition, a much larger number of cutting blades can be provided on each cutter than is possible where the cutters are constructed to interlock in operation.

Inasmuch as during the second revolution of the gear blank in the method of operation of the present invention, the cutters are simply widening out the previously-cut slots, they do not have as much work to perform as on the first revolution of the blank. Advantage has been taken of this fact, therefore, to speed up the cutting operation on the second cut in the different tooth slots. This makes it possible to cut a given gear much faster with the machine of the present invention than with previous processes employing two eccentric tools which are mounted to operate in two different tooth spaces simultaneously because heretofore even though one cutter might simply be widening out a tooth slot, the other cutter was cutting into solid metal and the speed of operation of the two cutters was limited by the time required for the operation of the latter cutter.

The present invention may be embodied in various forms of machines. A machine of the type described in my prior application above mentioned may very readily be modified, however, to practice the present invention. For convenience in explanation, then, I shall describe how such a machine may be changed to practice the present invention. In this description, I shall describe specifically only the new parts required and such of the parts used on the prior machine and retained as are essential to a proper understanding of the present invention. Reference may be had to the prior application for a more detailed description of other parts.

In order to identify more clearly the parts used in my prior machine which are retained in the improved machine of my present application, such parts have been generally denoted in the present application by reference numerals over 1000 and, in fact, by reference numerals which are 1000 higher than the reference numerals used in my prior application to designate them. Thus the column or upright 1031 (Fig. 1) in which the cradle is journaled is the same as the column or upright 31 used in the machine of my prior application.

The machine of my prior application is a machine for generating gears and particularly for rough-cutting gears. The present invention may be applied broadly, however, to the production of gears either in a generating or a forming operation and to either the rough cutting or finish-cutting of gears.

The machine illustrated in the drawings is, however, a generating machine like the machine illustrated in my prior application. This machine operates according to the basic principles of the machine of my prior application and has generally the same basic operating mechanism. The cycle of machine operation is the same. The work is fed into the cutting apparatus until full depth position is reached and the feed is stopped, then the work is rolled relative to the cutting apparatus to generate a tooth surface or surfaces on the work, then the roll is stopped and the work is withdrawn, then the roll is reversed and during this return roll, the work is indexed. Then the cycle begins anew.

The cutting mechanism is mounted upon a cradle which is oscillated in time with the rotation of the work spindle 1120 (Fig. 21) to effect the generating roll. The roll movements are produced, as in the machine of my prior application, by reciprocation of a fluid-pressure operated piston 1170 (Fig. 20) which drives the cradle through a train of gearing, identical with that described in my prior application and including the rack 1181, the spur gear 1215 and bevel gear 1224 (Fig. 2) and which drives the work spindle 1160 through a train of gearing 1190, 1195, 1198, 1199, 1202, 1205, 1210 and 1135, also identical with that described in my prior application. The gear 1135 is connected during cutting to the work spindle by the index mechanism of the machine.

The alternate feed and withdrawal movements of the work are produced by reciprocation of the fluid-pressure operated piston 1350 (Fig. 21) which is connected by the link 1360 with the pivoted work head 1050 in which the work spindle is journaled.

The direction of movement of the roll piston 1170 (Fig. 20) is controlled by the reverse valve 1266 and the direction of movement of the feed piston 1350 (Fig. 21) is controlled by the reverse valve 1425. These valves are operated alternately with one another, to effect the cycle of operation of the machine by operation of two pilot valves 1426 (Fig. 20) and 1396 (Fig. 21). The valve 1426 controls the operation of the feed reverse valve 1425 and is operated from the roll piston 1170 through the gearing 1181, 1215 and 1305, the stops 1450 and 1451 and the lever 1454 just as in the machine of my prior application. The valve 1396 controls the operation of the roll reverse valve 1266 and is operated from the movement of the work head 1050 through the link 1371 (Fig. 21), bar 1375, stops 1385 and 1395 carried by that bar, and lever 1403 also just as in the machine of my prior application.

Figure 15:
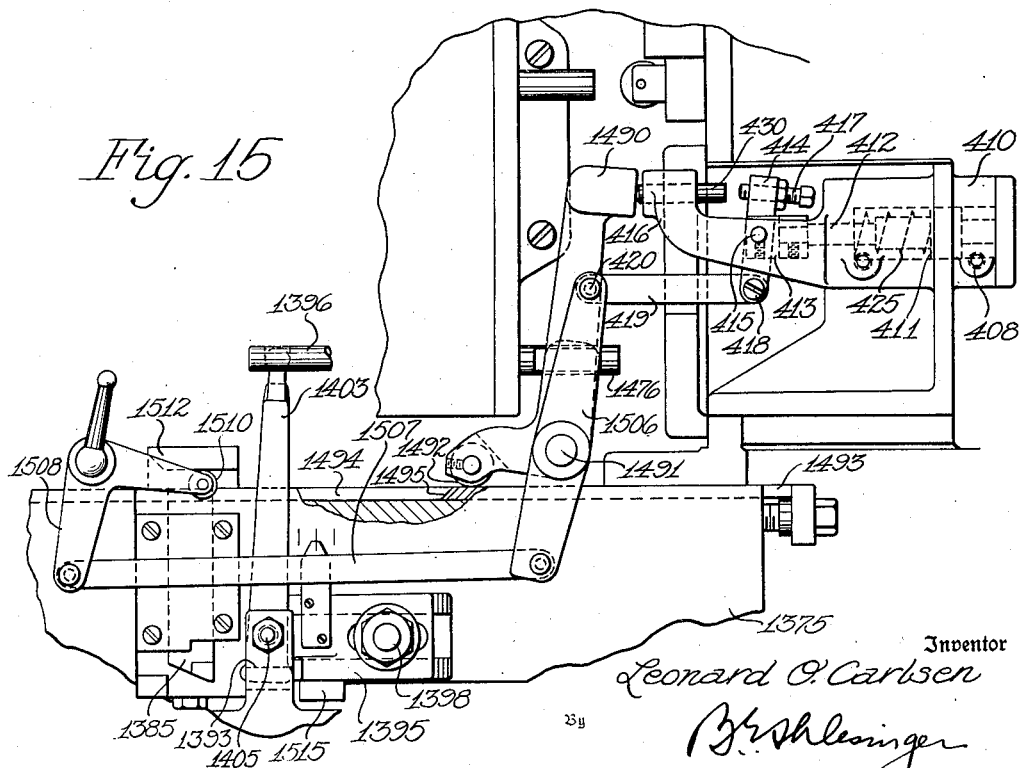
Fig. 15 is a fragmentary view of the work head column of the improved machine and showing the stops for limiting the work head movement and the controls for the same.

The rate of the generating roll is controlled by a throttle valve 1260 (Fig. 20) which is operated by a lever 1310 which is oscillated by a cam 1300 driven from the roll piston 1170 through the gearing 1181, 1215, 1305 and shaft 1301 just as in the machine of my prior application. The rate of the feed and withdrawal movements are controlled by a throttle valve 1475 (Fig. 21) which is operated by a lever 1490, that is controlled by a cam-bar 1493 (Fig. 15) carried by the bar 1375 (Figs. 15 and 21).

These parts and the connections between them may be identical with the corresponding parts described in my prior application. I shall now describe the features which are new in my present application and constitute the improvements of the present invention. The improved cutting mechanism of the present invention, its mounting and operation will first be described.

The cutting mechanism of my present invention comprises, as above mentioned, a pair of eccentrically mounted face-mill gear cutters. These cutters are designated at C and C', respectively.

The internal cutter C comprises a rotary head 30 (Figs. 1, 2, 3 and 16) and a plurality of annularly arranged cutting blades 31 which have body portions that are secured in blade receiving slots in the head 30 and cutting portions that project beyond one side-face of the head.

The cutting blades 31 are so formed that the median lines 32 of their body portions are inclined to the median lines 33 of their cutting portions, as clearly shown in Fig. 16. The inside walls 35 of the slots in the head 30 in which the blades are mounted, are inclined to the axis of the head at an angle such that when the blades are secured in these slots, the cutting portions of the blades will project beyond one side face of the head with their median lines 33 extending in a direction generally parallel to the axis of the head.

The blades 31 are secured to the head 30 by bolts 37 which extend in a direction perpendicular to the inside walls 35 of the blade slots.

The bottom faces 38 of the blades are adapted to seat upon the conical upper face of a plate 39 which is secured to the head 30 in any suitable manner and which serves to correctly position the blades axially in the head.

The external cutter C' comprises a head 40 in the form of a ring provided internally with blade receiving slots. The cutting blades 41 are secured in these slots. Each cutting blade has a body portion whose median line 42 is inclined to the median line 43 of the cutting portion of the blade and the inside walls 45 of the blade receiving slots are so inclined to the axis of the cutter head 40 that when the blades are secured in the slots, with their cutting portions projecting beyond one side face of the head, the median lines 43 of the blades will extend in a direction generally parallel to the axis of the head. Each blade is secured in a blade receiving slot by a bolt 47 which extends in a direction substantially perpendicular to the inside wall 45 of the slot. The bottom faces 48 of the blades seat upon a plate 49 which is secured in any suitable manner to the head 40 and which has an upper conical surface. This plate serves to position the blades axially in the head.

The cutting portions of the blades 31 and 41 may be relieved and sharpened in any usual or suitable manner. Certain of the blades may be bottom cutting blades and other side cutting blades or all may be side cutting blades. Moreover the side cutting blades may be sharpened so that different blades cut on opposite sides of a tooth space or all of the blades may be sharpened so that they cut simultaneously on opposite sides of a tooth space. The cutters, moreover, may be of the segmental type or may also be made with the cutting blades or teeth integral with their heads. Other modifications will occur to those skilled in the art.

The internal cutter C is secured by screws or bolts 50 to a spindle 52 which is keyed to a sleeve 53 (Figs. 2 and 4) to be rotatable with the sleeve but to be axially adjustable therein. The sleeve 53 is journaled on anti-friction bearings 55 and 56 in a sleeve 58 which is eccentrically mounted in a rotatably adjustable cutter-carrier 60.

Figure 3:
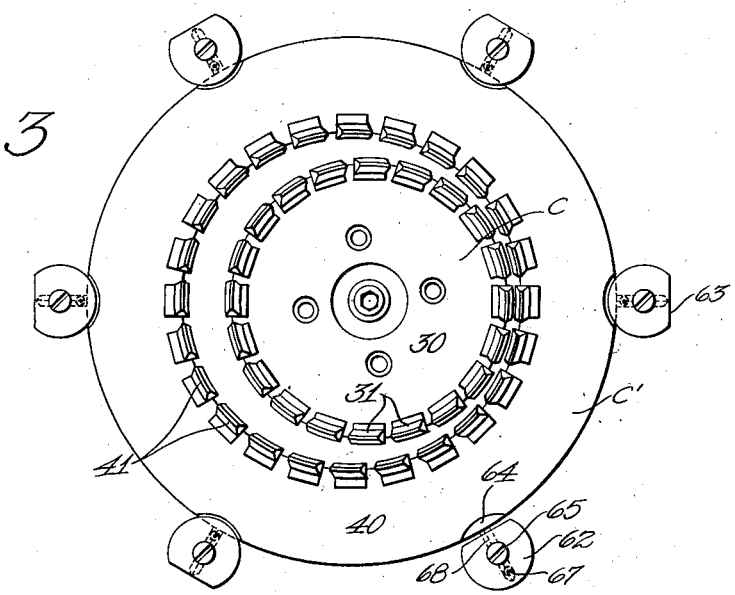
Fig. 3 is an elevational view on an enlarged scale of the two cutters used upon the improved machine.

The cutter C' is secured to a plate or disc 61 (Fig. 2) in any suitable manner. The securing means illustrated in the drawings, comprise six washers or discs 62, each of which has a flattened off portion at one side designated at 63 (Figs. 1 and 3). The cutter head or ring 40 has six arcuate slots 64 formed around its periphery. The discs 62 are secured to the plate 61 by screws 65. When the discs are rotated to a position where they overlie the slots or recesses 64 and the screws 65 are tightened up, the cutter head 40 may be rigidly secured to the plate 61; but when the screws 65 are loosened, the discs may be rotated to a position where the flattened off portions 63 of the discs are adjacent the recesses or slots 64 and the cutter head 40 may be taken off of the machine. One of the discs is shown rotated to this inoperative position in Fig. 3. The discs are frictionally locked in operative position against rotation by small spring-pressed plungers 67, as shown in Fig. 2. These plungers engage in kerfs or slots 68 formed in a ring or plate 69 which is secured to the plate 61 by the bolts 65 and screws 70.

The plate 61 is provided with a radial slot 80 and a roller 81 carried by a pin 82 projects into this slot. The pin 82 is secured by screws 83 to a drive plate 85, which in turn is secured by screws 86 to the sleeve 53 in which the cutter spindle 52 is mounted.

There is an internal gear 1100 secured by screws 89 to the drive-plate 85. This internal gear is driven to impart rotation to both the cutters C and C'.

The drive to the internal gear 1100 is similar to the cutter drive described in my prior application and includes the stud shaft 1076 which is driven from any suitable source of power; the spur gears 1088, 1089, the shaft 1090, the spur gears 1093 and 1094 and the shaft 1095 and the spur pinion 1098.

The carrier 60 for the cutter mechanism is journaled eccentrically in the cradle 100, having bearings at 101 and 102 in the cradle. The carrier 60 is rotatably adjustable in the cradle to position the cutters to cut a gear having teeth of a given spiral angle. The adjustment is made in a manner similar to the adjustment of the corresponding carrier of my prior machine by rotation of the stub-shaft 1110 which is journaled in a bracket 106 that is secured in the cradle 100 and is connected by screws 107 to a plate 108 that is secured to the cradle 100 by screws 109. The stub-shaft 1110 has a pinion 1111 integral with it which meshes with a spur gear 1112 that in turn meshes with the large spur gear 1113 which is secured to the carrier 60.

The shaft 1076 is journaled in the cradle 100 coaxially of the cradle and the shaft 1090 is journaled in the cradle coaxially of the carrier 60. This is the same construction as is employed in the machine of my prior application and permits of adjusting the carrier angularly in the cradle without requiring the cutter drive to be made through a telescoping shaft.

Figure 4:
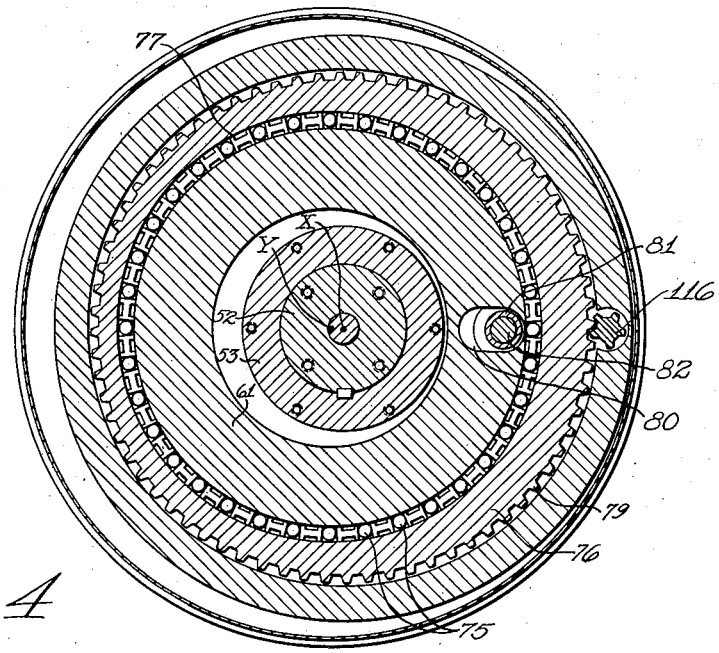
Fig. 4 is a section on the line 4—4 of Fig. 2 and showing details of the cutter drive.

The distance between the cutters C and C' at the point of cut can be adjusted by rotation of the shaft 115 which carries a spur pinion 116 that meshes with the spur gear 76 (Figs. 2 and 4). This spur gear 76 forms the outer race-way of a set of roller-bearings 75 whose inner race-way is formed by the peripheral surface of the drive-plate 61. The internal surface 77 of the spur gear 76 is eccentric of its toothed peripheral portion 79. The internal surface 77 is turned concentric of the axis Y (Fig. 4) of the cutter C' and its head 40 and the external toothed portion is concentric of the axis X of the cutter C and its spindle 52. As the spur gear is rotated angularly, then, it shifts the drive-plate 61 laterally due to the eccentricity of the inside and outside surfaces 77 and 79 of the gear but without varying the distance between the axes X and Y of the two cutters. Through this adjustment the cutter C' is rotated angularly about the cutter C and the distance between the cutters at any given point can be varied. Hence the distance between the cutters at the point of cut can be controlled and different gears having teeth which taper in width differently from end to end can be cut.

The shaft 115 is journaled in a guard-member or housing 118 which is secured by screws 119' to the sleeve-member 58. The spur gear 76 is held against axial movement between a shoulder formed on the housing 118 and gib-plate 119 which is secured to the guard by screws 120.

Rings or plates 125 and 126 (Fig. 2) are secured in any convenient manner to the plate 61 and a disc 127, respectively, to guard against entry of dirt or chips into the parts in any position of eccentric adjustment of the cutter. The plate 127 which forms a gib to prevent axial movement of the plate 61, is secured to the sleeve or quill 53 by screws 128. A guard or cover 130, which is secured to the plate 61 by screws 131, surrounds the parts to further protect the same.

Figure 5:
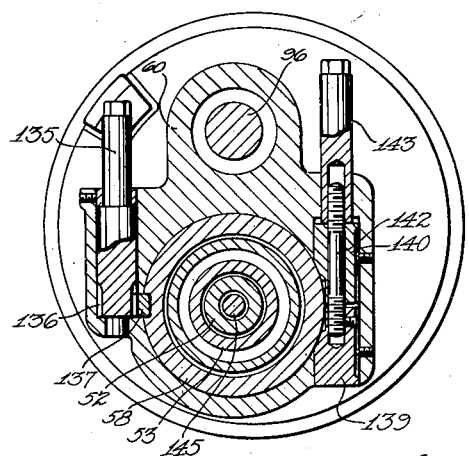
Fig. 5 is a section on the line 5—5 of Fig. 2.

The cutters are adjustable axially together to compensate for wear, etc. by rotation of a stub-shaft 135 (Fig. 5) which is journaled in the carrier 60 and which has a spur pinion 136 formed integral with it that meshes with a rack 137 that is secured by screws 138 (Fig. 2) to the sleeve 58. The sleeve 58 is secured in any position of its axial adjustment by the clamping-blocks 139 and 140 (Fig. 5) which are shaped to engage the periphery of the sleeve 58 and which may be moved to clamping position or released by rotation of the threaded rod 142 in one direction or the other, through rotation of the sleeve 143. Clamping mechanism of this type is well known in the art and need not further be described here.

The cutter spindle 52 is adjustable axially independently of the last described adjustment by rotation of a rod 145 (Figs. 2 and 5) which is threaded at 146 to engage internal screw threads formed in a central bore in the cutter spindle 52. The rod 145 is journaled in a nut 147 that is threaded into the inner end of the sleeve or quill 53. A nut 148 threads onto the outer end of the rod 145 and serves to lock the spindle 52 in any adjusted axial position.

The cradle 100 is a full circular cradle and is journaled in the frame 1031 of the machine, the bearing being of the capped type as shown in Fig. 1 and as described in more detail in my prior application.

As previously stated, the generating roll of the machine is imparted to the work spindle 1120 through the hypoid gear 1135 (Figs. 20 and 11) and the indexing mechanism of the machine which locks the work spindle to the hypoid gear 1135 during cutting. The indexing mechanism of the improved machine of the present invention will now be described.

This index mechanism includes a double-armed lever 187 (Figs. 6, 7, 8, 9 and 11). This lever is pivotally mounted by means of anti-friction bearings 188 upon a stud 185 which is secured in a boss 1137 of a member 1130 that is secured by screws 1136 to the hypoid gear 1135 already referred to.

There is a locking-dog 190 secured to the long arm of this lever 187 by screws 191. This locking dog is adapted to engage in the notches 192 of an index plate 193 which is secured by screws 194 to a ratchet wheel 195 that is keyed to the work spindle 1120. The ratchet wheel is held against axial movement on the work spindle by the spanner nut 197 which threads onto the end of the work spindle.

Figure 8:
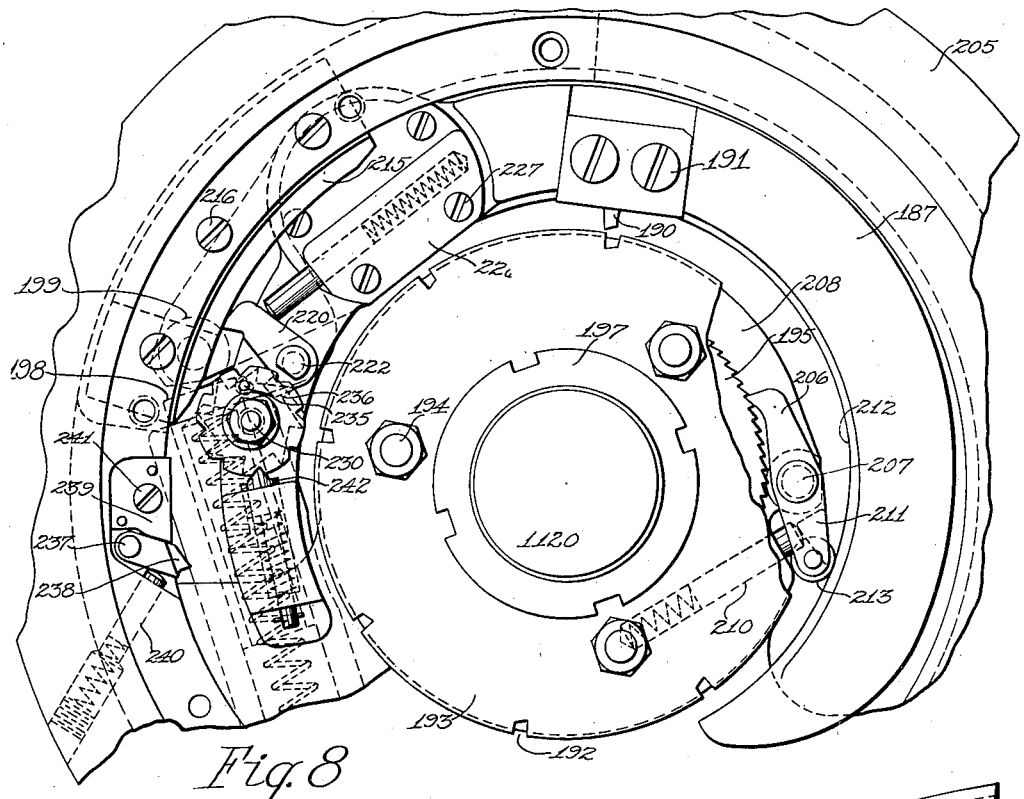

The locking-dog 190 is normally urged into engagement with one of the notches of the index plate 193 by a spring-pressed plunger 198 which is shown in dotted lines in Fig. 8 and which is housed in a boss formed integral with the member 1130. This plunger engages a roller 199 (Figs. 8 and 9) that is secured in an arm 200 which is integral with the lever 187.

When the locking-dog 190 is in locking position, motion will be transmitted, then, from the hypoid gear 1135 through the member 1130, the locking dog 190, the index plate 193 and the ratchet wheel 195 to the work spindle 1120 to rotate the work spindle in timed relation with the cradle rotation and effect generation of the tooth surfaces of the gear being cut.

The work spindle is journaled in the work head 1050. A pawl, denoted at 206, is adapted to engage the ratchet wheel 195 to lock the work spindle against rotation, when the locking dog 190 is disengaged from the index plate, thereby to permit of effecting the indexing operation. This pawl 206 is pivotally mounted upon a stud 207 that is carried by a plate 208 which is secured by screws 209 to the work head 1050.

The pawl 206 is normally urged into engagement with the ratchet wheel 195 by a spring-pressed plunger 210 which is housed in the plate 208 and which engages a lug 211 formed integral with the tail of the pawl 206. The lever arm 187 is formed with a cam surface 212 on its under face. When the locking dog 190 is in operative position, this cam surface engages the roller 213, which is carried by the tail of the pawl 206 to hold the pawl in retracted or disengaged position.

The point in the rolling motion at which the locking dog 190 is disengaged from the index plate 193 and the time during which the locking dog is disengaged are determined by a cam-plate 215 (Figs. 6, 7, 8 and 10). This plate is secured to the work head 1050 by screws 216. It has two cam surfaces on its under face. One of these is denoted at 217 in Fig. 10 and the other at 218. The surface 217 is of much greater angular extent than the surface 218.

Figure 6:
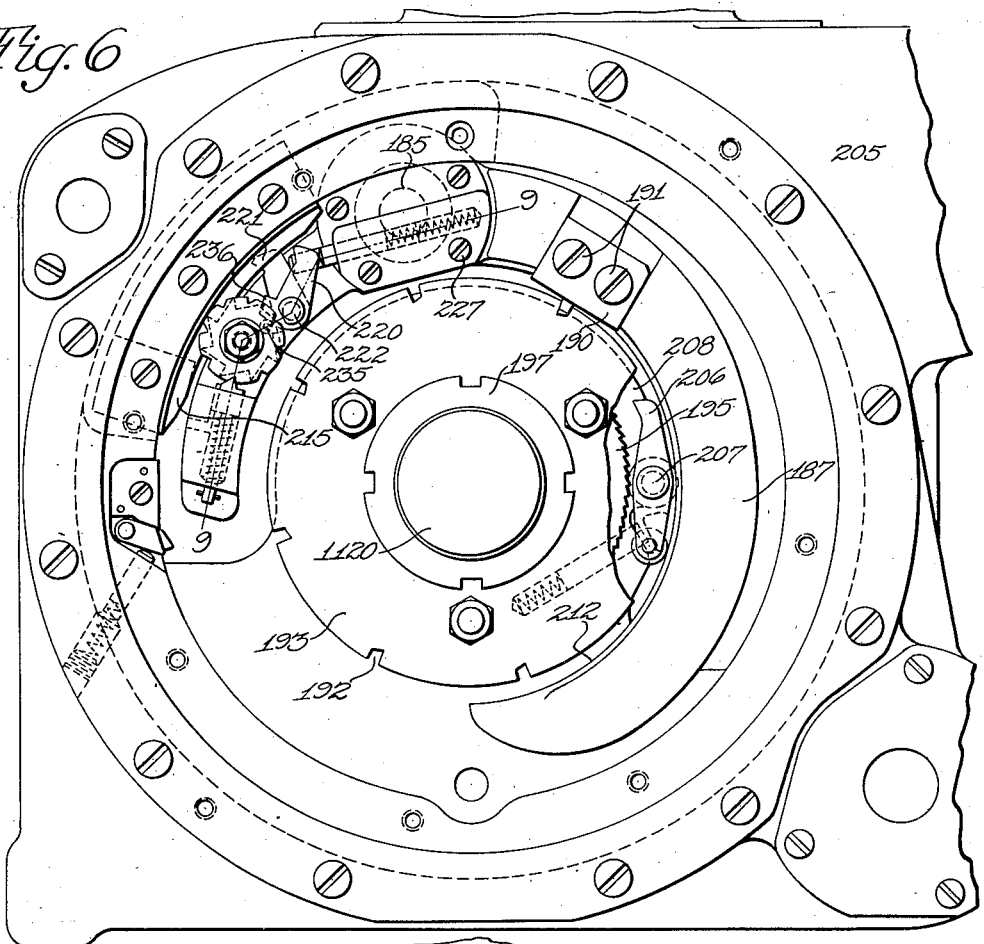
Figs. 6, 7 and 8 are elevational views of the index mechanism of the improved machine showing three different positions of this mechanism during the operation of the machine.
Figure 7:
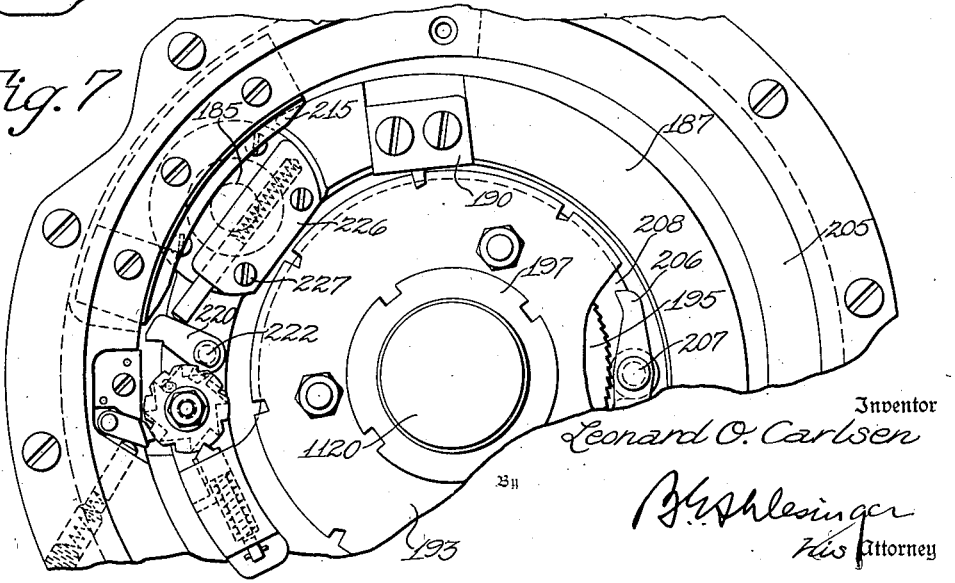
Figures 9, 10:
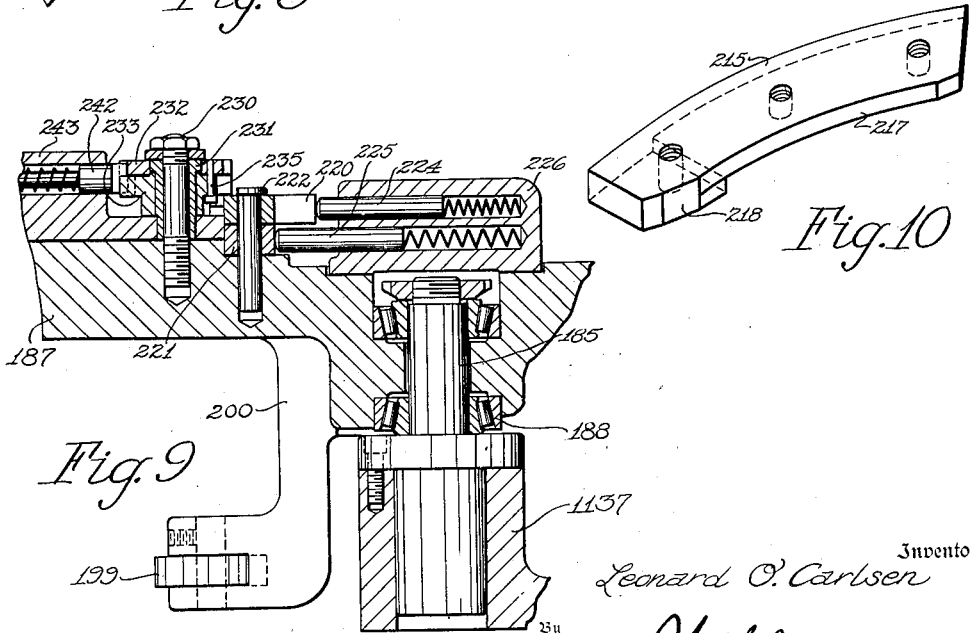
Fig. 9 is a developed sectional view taken on the line 9—9 of Fig. 6.
Fig. 10 is a perspective view of the cam rail which controls the time that the index mechanism is unlocked in any indexing operation and therefore the angle through which the blank is rotated during indexing.

There are two trip-dogs 220 and 221 pivotally mounted upon a stud 222 that is secured in the lever 187, see particularly Figs. 6 and 9. The dog 220 is adapted to engage and ride upon the cam surface 217 of the plate 215 and the dog 221 is adapted to engage and ride upon the cam surface 218 of this plate. The dog 220 is resiliently held in operative position by a spring-pressed plunger 224 and the dog 221 is resiliently held in position by a spring-pressed plunger 225. Both of these plungers are housed in a plate 226 which is secured to the lever 187 by screws 227.

The trip-dog 221 is always held resiliently by its plunger 225 in its operative position. The dog 220 can be locked positively out of operative position during one or more indexing operations, as will now be described.

230 is a screw which is threaded into the short end of the lever arm 187. There is a bushing 231 carried by this screw. Journaled upon this bushing are two star-wheels or ratchet wheels 232 and 233 which are pinned together so that they rotate together. They might in fact be integral. These wheels carry one or more pins 235 which is or are adapted to engage the tail 236 of the trip-dog 220 to move that dog out of operative position, as shown in Fig. 6, when the ratchet wheel has been advanced far enough to bring the pin into engagement with the tail of the dog.

The ratchet wheel is advanced step-by-step on each oscillation of the lever arm 187 by a pawl 238 which is pivotally mounted on a pin 239 secured in the work head 1050. The pawl is held against a shoulder piece 239 by a spring-pressed plunger 240 which is housed in the work head. The shoulder piece 239 is secured to the work head by a screw 241 and dowel-pins. When the lever arm 187 rotates in a counter-clockwise direction, the pawl ratchets over the wheel 233 without advancing the same, but when the lever arm 187 moves back in the clockwise direction, the pawl engages the ratchet wheel 233 and advances it one step. The ratchet wheels are held against reverse rotation by a spring-pressed plunger 242 which is housed in a boss 243 of the lever arm 187 and which engages the ratchet wheel 232.

The cam surface 218 of the trip rail 215 is only long enough to hold the locking-dog 190 momentarily out of engagement with the index plate 193. It then permits the locking dog to drop back on to the periphery of the plate so that when the dog registers with the next notch in the plate, the plate will be locked up again. The cam surface 217 of the trip-rail 215, however, is long enough so that it will hold the lock lever 187 in disengaged position while the lever is rotating through an angular distance greater than the distance between two successive notches of the index plate, before allowing the lever to return to locking position.

The operation of the index mechanism may now be described. Assuming that the parts are in the position shown in Fig. 7, the work spindle is locked to rotate with the hypoid gear 1135 by engagement of the locking dog 190 in one of the notches 192 of the index plate 193. As the lock-lever 187 moves in a clockwise direction, then, the work spindle 1120 will move with it, but when the trip-dogs 220 and 221 engage the cam-surfaces 217 and 218 of the trip-rail 215, the lock lever 187 will be pivoted about the stub-shaft 185 and the locking dog 190 will be disengaged from the index plate. As the locking lever is withdrawn from operative position, the cam surface 212 of the lock lever 187 will move away from the roller 213 of the pawl 206 and permit the pawl to engage the ratchet wheel 195 under actuation of the spring-pressed plunger 210. This position of the parts is shown in Fig. 8.

The work spindle 1120 is now held stationary, but the lever 187 and the parts carried thereby continue to move in the clockwise direction under actuation of the hypoid gear 1135. The lever arm 187 remains in disengaged position as long as the trip-dog 220 is travelling on the cam surface 217 of the rail 215. When the trip-dog 220 travels off of the end of the rail 215, the lock lever 187 is released and the locking dog 190 drops on to the periphery of the plate 193 and, as soon as it reaches a notch in the plate, it drops into that notch under actuation of the spring plunger. Since the cam surface 217 is, as described, longer than the angular distance between two notches of the index plate 193, the locking dog 190 at the end of the indexing operation will not engage in the next succeeding notch, but in the second succeeding notch to that in which it has previously been engaged. As the locking dog thus returns to locking position, the pawl 206 is disengaged from the ratchet wheel 195 through contact of the cam surface 212 of the lever 187 with the roller 213. The indexing operation is now complete.

When the roll in the opposite direction takes place, that is, when the lock-lever 187 moves in the counter-clockwise direction from the position last described, the trip-dog 220 is again brought into engagement with the cam surface 217 of the rail 215, but the lock-lever 187 is not moved out of engaging position because the trip-dog 220 simply rocks about its pivot 222 in a clockwise direction against the resistance of the spring plunger 224. Likewise, when the trip-dog 221 comes into engagement with the cam surface 218 of the rail, it also is swung about the pivot 222 against the resistance of the spring plunger 225. When the ratchet wheel 232 comes into engagement with the pawl 238, the pawl ratchets idly over the wheel, being moved clockwise about its pivot 237 against the resistance of the spring plunger 240.

In this counter-clockwise movement of the parts, the work spindle is, of course, locked to the hypoid gear 1135 by the index mechanism and partakes of the rolling movement. The counter-clockwise movement continues until the trip-dogs 220 and 221 have moved clear of the rail 215 in the counter-clockwise direction and the ratchet wheels 232 and 233 have also moved beyond the pawl 238 in the counter-clockwise direction.

When reversal of the direction of movement of the parts again takes place under actuation of the piston 1170 (Fig. 20), the pawl 238 again engages the ratchet wheel 232, but this time, the pawl 238 abuts against the stop-plate 239 and moves the ratchet wheel one step as the ratchet wheel passes under the pawl. When the trip-dogs 220 and 221 again come into engagement with the rail 215, the lock lever 187 is again swung about its pivot 185 to move the locking-dog 190 from locking position, as above described, and the locking lever is held out of locking position while the trip dog 220 is travelling on the cam surface 217 of the rail so that the work spindle is indexed through a space equal to the angular distance of two notches of the index plate before the index mechanism is again locked up, as above described.

The operation of the machine proceeds in the manner described, a pair of tooth spaces of the blank being cut during the generating roll, then the blank is withdrawn from engagement with the cutter, then on the return roll the blank is indexed, then the blank is returned into engagement with the cutter and the generating roll begins anew. Each time that the ratchet wheel 232 passes the pawl 238 in the clockwise movement of the lock lever 187, the ratchet wheels 232 and 233 are rotated counter-clockwise one step. Finally, they will reach a position such as shown in Fig. 6 where the pin 235 carried by them is moved into engagement with the tail 236 of the trip dog 220 and this trip dog is held out of operative position, as shown.

On the continued clockwise movement of the lever 187, then, the trip dog 220 will not engage the rail 215 and only the trip dog 221 will engage this rail. Therefore, the lock lever 187 will only be held out of locking position as long as the trip dog 221 is travelling on the short cam surface 218 of the rail. This distance is only sufficient to hold the locking dog 190 out of position until it has passed beyond that notch 192 of the index plate with which it has just been in engagement and then the lock lever 187 is released and the dog 190 drops back on to the periphery of the index plate. When it comes to the next notch 192 of the plate, it drops into engagement with that notch, relocking the index mechanism. Thus, on this clockwise movement of the lever 187, with the dog 220 out of operative position, the work spindle will be indexed only one notch of the index plate.

On the ensuing reverse, counter-clockwise movement of the lever 187, the dog 220 will still be held out of operative position, and the dog 221 will pass idly over the cam surface 218. The next time, however, that the ratchet wheel 232 moves over the pawl 238 in the clockwise movement of the lever 187, the ratchet wheel will be rotated another step and this will be enough to move the pin 235 out of engagement with the tail 236 of the trip dog 220 and the dog 220 will be released so that it will return to operative position under actuation of the plunger 224. Hence, on continued movement of the lever 187 in the clockwise direction, the work spindle will again be indexed through the angular distance of two notches of the index plate because the lever 187 will again be held out of locking position while the trip dog 220 is travelling on the cam surface 217 of the rail 215.

By suitably positioning the ratchet wheels 232 and 233, the single space indexing can be made to occur at any desired point in the operation of cutting a gear. Further, by employing a ratchet wheel that has a plurality of pins, the single space indexing can be repeated a plurality of times in the operation of cutting a given gear. When only double-space indexing is desired in the cutting of a given gear, the ratchet wheels 232 and 233 may be removed from the machine.

The cam rail 215 is beveled at both ends of the cam surfaces 217 and 218 as shown clearly in Fig. 10 to minimize shock of engagement of the trip dogs with the cam surfaces.

Two ways of indexing the gear blank to accomplish the purposes of the present invention, namely of substantially equalizing the work of the two cutters during cutting of a given gear, are illustrated diagrammatically in Figs. 18 and 19.

As above indicated, the two cutters C and C' are arranged to cut simultaneously in two different tooth spaces of a blank. Fig. 18 shows the method of indexing the blank for cutting a gear blank which is to have an odd number of teeth. Let us assume that when the cutters first engage the gear blank, which is denoted at G and from which a gear having seven teeth 250, 251, 252, 253, 254, 255, 256 is to be cut, the two cutters operate upon opposite sides of what is to be tooth 250 of the gear. In the generating roll, then, one cutter C will remove from one tooth space 260 of the blank, the amount of stock between the lines 270 and 271 and the other cutter C' will remove from the adjacent tooth space 261 the amount of stock between the lines 272 and 273.

In this operation, each of the cutters will cut a slot of uniform longitudinal width, as shown more clearly in Fig. 17, but the sides 270 and 273 of these slots which bound the tooth 250 will be non-parallel and converge toward the apex of the gear because of the eccentric mounting of the two cutters. In other words, the two cutters will generate a tooth 250 which tapers longitudinally in width from end to end.

After the two cutters have cut the two slots described, they will be withdrawn from engagement with the blank and the blank will be indexed. In this case, the indexing will be through the distance of two tooth spaces of the blank so that the outside cutter C' will, on reengagement with the blank, cut in the tooth space 263 of the blank and the inside cutter C will cut in the tooth space 262. The outside cutter will on the new generating roll, then, remove stock from the tooth space 263 between the lines 274 and 275 and the inside cutter will remove stock from the tooth space 262 between the lines 276 and 277, each cutter cutting a slot of uniform width from end to end.

After the next indexing operation, the two cutters C and C', respectively, will cut into the next two tooth spaces 264 and 265, respectively of the blank and cut stock from these tooth spaces between the lines 278 and 279 and between the lines 276 and 277, respectively, again producing slots of uniform width from end to end.

After the next indexing operation, the cutter C will cut into the tooth space 266 while the cutter C' will operate in the tooth space 260 which has previously been slotted out by the cutter C. The cutter C will remove stock from the tooth space 266 between the lines 280 and 281. The cutter C' however, cutting from a different center than the cutter C, will act to enlarge the tooth space 260 at one side thereof, removing the stock which lies beneath the line 271 and the line 283. This will produce a tapered tooth space as will be clear from Fig. 17.

The work will now have been indexed through one revolution. The double-indexing will be continued however. After the next indexing operation, the two cutters C' and C will cut, respectively, in the tooth spaces 262 and 261 and will remove the portions which are shaded and denoted at 285 and 286, respectively. Since each cutter is now operating in a tooth space previously slotted out by the other cutter, the tooth spaces 262 and 261 will be widened out and tapered. The slot 261, for instance, will now have the longitudinally converging sides 273 and 284 as shown in Fig. 17.

After the next indexing operation, the two cutters will cut in the tooth spaces 264 and 263, respectively, and remove the shaded portions denoted at 287 and 288, respectively, thus, again producing the desired tapering width of the tooth slots. After the next indexing operation, the cutters will cut in the tooth slots 266 and 265, respectively, removing the stock denoted by the shaded portions at 290 and 291, respectively, and producing the desired tapering width of these tooth slots also. The work of cutting the gear will now have been completed. All of the tooth spaces will taper in width from the large to the small ends thereof and all of the teeth will taper in width correspondingly. Thus, in the cutting of this gear G which has an odd number of teeth, the blank is indexed through the distance of two tooth spaces on each indexing operation and first slots of uniform width from end to end will be cut in the tooth spaces all around the blank and then these slots will be widened out and given their tapered shape.

Fig. 19 illustrates one way of indexing a gear blank which is to have an even number of teeth. The gear is denoted at G'. It is to be provided with equally spaced teeth 300, 301, 302, 303, 304, 305, 306 and 307 which are to be separated by tooth spaces 310, 311, 312, 313, 314, 315, 316 and 317.

Let us assume that the cutters C' and C will first cut into the tooth spaces 310 and 317, respectively. The cutter C will remove stock from the space 317 between the lines 320 and 321 while the cutter C' will remove stock from the tooth space 310 between the lines 322 and 323, respectively. The slots cut by the two cutters in this stage of the operation will be of uniform width from end to end.

When the gear blank is indexed, it will be indexed through the distance of two tooth spaces so that the cutter C will cut in the tooth space 311 removing stock from between the lines 324 and 325 and the cutter C' will cut in the tooth space 312 removing stock from between the lines 326 and 327, each cutter again cutting a slot of uniform width from end to end. After the next indexing operation, the two cutters will cut in the tooth spaces 313 and 314, respectively. The cutter C will remove stock from the tooth space 313 between the lines 328 and 329, respectively, while the tooth cutter C' will remove stock from the tooth space 314 from between the lines 330 and 331, respectively. The slots cut will again be of uniform width from end to end.

The blank will again be indexed through the distance of two tooth spaces and the cutters will cut anew in the tooth spaces 315 and 316, cutting the slots bounded by the lines 332 and 333 and the lines 334 and 335, respectively.

Ratchet wheels 232 and 233 will have been provided for the cutting of this gear blank G' which will now operate to bring the pin 235 into engagement with the tail 236 of the trip-dog 220 (Figs. 6 and 9) and move this dog out of operative position so that on the next indexing operation, the blank will be indexed only through the distance of a single tooth space. The result will be that on the next cutting operation, the cutter C will operate in the tooth space 316 which has previously been slotted out by the cutter C' while the cutter C' will operate in the tooth slot 317 which has previously been slotted out by the cutter C. The cutter C will cut out the portion shown shaded between the lines 335 and 337 and since it is eccentric of the cutter C' it will in this operation give the tooth space its desired tapered lengthwise shape. The cutter C' will cut out the shaded part between the lines 320 and 340, producing the desired taper in width of the tooth space 317.

As the index lever 187 reverses its direction of movement after the generating roll has been completed, the ratchet wheels 232 and 233 will be advanced a step withdrawing the pin 235 from engagement with the trip dog 220 and this dog will return to operative position under actuation of the spring pressed plunger 224. The index mechanism will, therefore, again double-index. The cutter C will therefore cut in the tooth slot 310 which has previously been operated upon by the cutter C' while the cutter C' will cut in the tooth slot 311 which has previously been operated upon by the cutter C. The cutter C will remove the shaded portion 341 from the tooth slot 310, producing the taper in width of this tooth slot, while the cutter C' will remove the shaded portion denoted at 342 from the tooth slot 311, producing the tapered shape of this tooth slot.

The blank will again be double-indexed after this cutting operation and when the cutters return into engagement with the blank, the cutter C will operate in the tooth space 312 removing the shaded portion 344 from that tooth space and giving the space the desired tapered lengthwise shape while the cutter C' will cut out the shaded portion denoted at 345, widening out the tooth slot 313 and giving it the desired tapered shape.

Again, after the cut has been completed and the cutters have been withdrawn, the blank is double indexed and when the cutters are returned into engagement with the blank, the cutter C' will cut in the tooth space 315 and the cutter C in the tooth space 314. The cutter C' will remove the shaded portion denoted at 347, widening out the tooth slot 315 which has previously been operated upon by the cutter C. The cutter C will cut out the shaded portion denoted at 348, widening out the tooth slot 314 which has previously been operated upon by the cutter C' and will give this slot the desired lengthwise taper in shape. The gear will now have been finished.

The ways of indexing described above for gears having odd or even numbers of teeth are understood to be only explanatory of the invention and various other indexing cycles will suggest themselves to those skilled in the art in order to achieve the desired result of distributing the work of cutting substantially equally between the two cutters by having the two cutters operate at all times in two separate tooth slots of the blank and first cut slots of uniform width from end to end in all of the tooth spaces to be produced and then widen out these tooth slots and give them the desired lengthwise taper in width.

It will be noted with reference to Figs. 17 and 18 and 19 that in the taper-cuts taken by the two cutters in the various tooth slots of the blank on the second time around the blank much less stock has to be removed than on the first slotting cuts in these tooth spaces. The greater portion of the stock is removed from the tooth spaces by the cutters when they take their first slotting cuts and only a relatively small amount of additional stock is required to be removed to produce the desired lengthwise taper in shape of the tooth spaces. For this reason, the operation of actually cutting the tooth slots can be speeded-up after slotting cuts have been taken all the way around in the different tooth slots of the blank. A speed-up mechanism is therefore provided on the improved machine of the present invention to accelerate the generating roll during the taper-cutting of the various tooth spaces, so that the generating roll will be at a faster rate during taper-cutting than during the initial slotting out of these tooth spaces.

As has already been mentioned, the generating and return rolls of my machine are produced by reciprocation of the piston 1170 (Fig. 20) and the direction of movement of this piston is controlled by a reverse valve 1266, which is controlled, in turn by a pilot valve 1396 (Fig. 21) through the ducts 1415 and 1419.

The speed of movement of the piston 1170 is controlled, as already mentioned also in the same way as in my prior machine, namely, by a throttle valve 1260 which controls the rate of exhaust either through the line 1272—1281 or the line 1271 of the motive fluid from the cylinder 1171 in which the piston 1170 reciprocates. The throttle valve also controls a hydraulic back-lash take-up mechanism in the work spindle drive and comprising a shoe 1237 and a paddle 1245 as described in detail in my prior application.

In the machine of my prior application, the amount of opening of the throttle valve 1260 is varied during each generating roll so as substantially to equalize the work of a cutter throughout the roll. The mechanism for effecting this variation in position of the throttle valve 1260 is retained in the machine of the present invention as already stated and comprises the cam 1300 which is driven in time with the generating movement of the machine, the double-armed lever 1310, the screw 1319 and the lever arm 1316 which is pivotally connected at one end to the rod 1318 of the throttle valve 1260. As the piston 1170 reciprocates during the generating roll, the cam 1300 is rotated to rock the levers 1310 and 1316 and vary the opening of the throttle valve.

In addition to this control mechanism for the throttle valve, there is provided in the machine of the present invention, means for increasing the opening of the throttle valve after the blank has been indexed through one revolution and all of its tooth spaces have been slotted out. This comprises a piston 350 (Figs. 12 and 20) which reciprocates in a cylinder 351. This cylinder is connected at opposite sides of the piston 350 by means of the ducts 352 and 353, respectively, with the lines 1419 and 1415, respectively, so that the piston 350 is shifted each time that the reverse valve 1266 is shifted.

The piston 350 is connected by means of a nut 354 to a piston rod 355 which reciprocates in suitable guides or bearings and is held against rotation by a key 357, which is shown in dotted lines in Fig. 12 and which is secured to the piston rod by screws 358.

Figure 13:
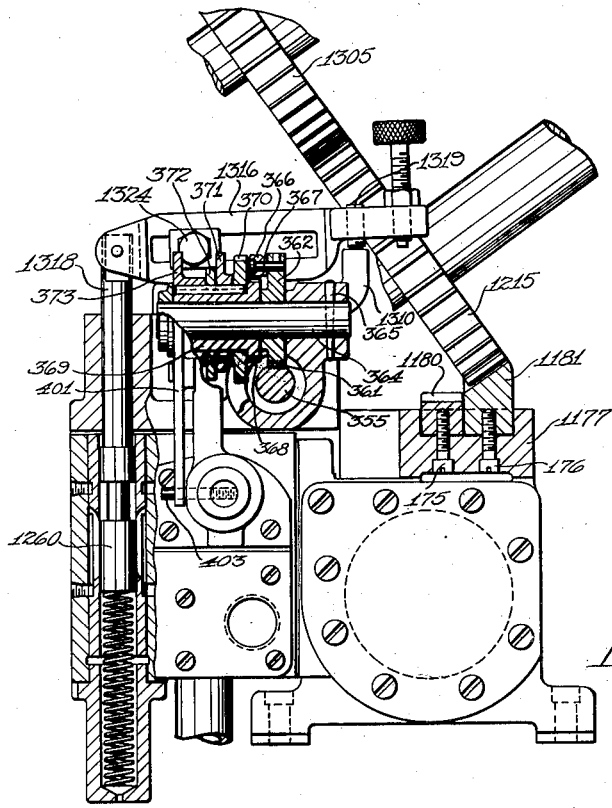
Fig. 13 is a view taken at right angles to Fig. 12 and showing further details of the speed-up control mechanism and its connection to the throttle valve.

There are rack teeth 360 formed integral with the piston rod 355. These rack teeth mesh with a spur gear segment 361 that is formed upon a rocker-arm 362 which is rotatably mounted upon a stud 364 (Fig. 13). This stud is held against rotation by a pin 365. A pawl 366 is pivotally mounted by means of the pin 367 upon the rocker-arm 362. This pawl is adapted to engage the teeth of a ratchet-wheel 368. The ratchet wheel 368 is formed with an elongated hub 369 that is journaled upon the stud 364 and this hub is keyed to a notched plate 370, to a pair of cams 371 and 372 and to a cam 373.

One of the cams 372 is provided with arcuate slots 375 and 376 (Fig. 12) that are concentric of the axis of the stud 364. Screws 377 which engage in these slots and thread into the cam 371 permit of adjusting the two cams angularly relative to one another about the center of the stud 364 and of securing the two cams together after adjustment.

There is a locking-dog 380 that is adapted to engage in the notches of the plate 370. This locking dog is carried by a lever arm 381 which is pivoted intermediate its ends upon a stud 382 that is secured in the casting which carries the other parts described. When the locking dog 380 is in engagement with a notch of the plate 370, the under-face of the arm 381 engages the tail of the pawl 366 to hold this pawl out of engagement with the teeth of the ratchet wheel 368, but when the arm 381 is moved to a position to disengage the dog 380 from the notched plate, the pawl 366 is released and may engage the ratchet wheel 368 by gravity or under pressure of a spring (not shown).

The short arm of the lock lever 381 is formed with a lug 383 which is adapted to be engaged by a trip-dog 384 that is pivotally mounted on the piston rod 355 by means of the pin 385. The trip dog 384 is constantly urged in one direction about its pivot pin 385 by a coil-spring 387 which is attached at one end to the trip dog and at its opposite end to the piston rod. The side of the piston rod upon which the trip dog is mounted is milled off flat and the square shoulder formed at one side of the milled-off portion of the rod acts as a stop to limit the pivotal movement of the trip-dog in the counter-clockwise direction.

The ratchet and pawl mechanism 368—366 is provided for the purpose of imparting a step-by-step advance movement to the cam plates 371 and 372. This movement will be in time with the other operations of the machine because the piston 350, which actuates the ratchet and pawl mechanism through the rack 360 and segment 361 is operated in time with the movement of the reverse valve 1266 for roll piston 1170. The locking dog 380 and notched plate 370 serve to lock the cam plates 371 and 372 in position after each step by step movement.

The cam plates 371 and 372 are adapted to engage with a roller 390 (Figs. 12 and 20) that is carried on one end of a rocker-arm 391. This rocker arm is keyed to a shaft 392 which is suitably journaled in the machine. Keyed to this shaft 392 is a lever arm 393 which is adapted to contact at its free end with a screw 394 that is adjustably threaded into the lever arm 1316 already referred to, which is pivotally connected to the stem 1318 of the throttle valve 1260. When the roller 390 is riding on the high part of a cam plate 371 or 372, then, the lever 1316 will be rocked about its pivot 1324 to depress the throttle valve 1260 and open the same more fully.

Figure 20:
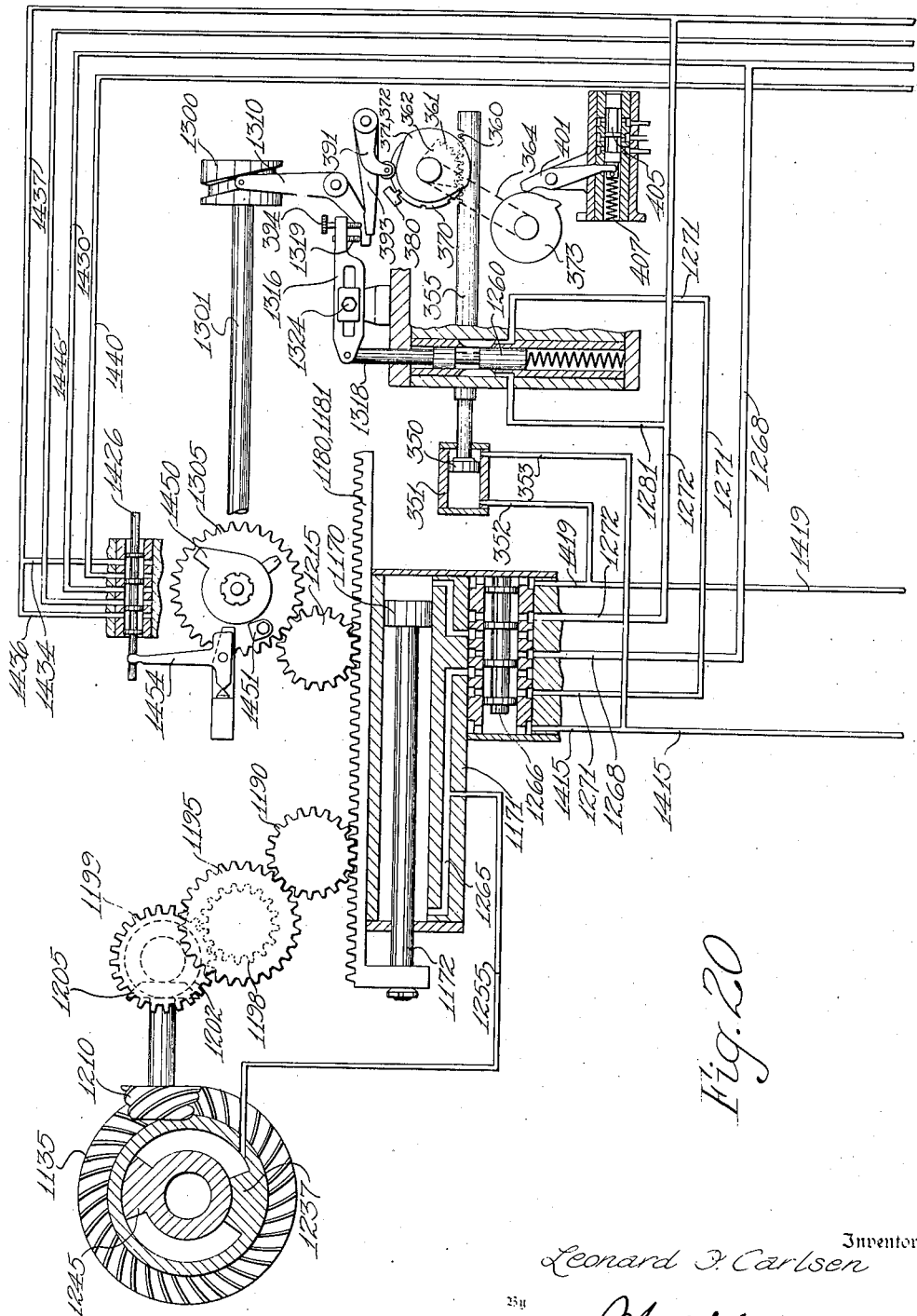
Figs. 20 and 21 are fragmentary diagrammatic views, showing, together, the hydraulic control system of the improved machine constructed according to the present invention.
Figure 21:
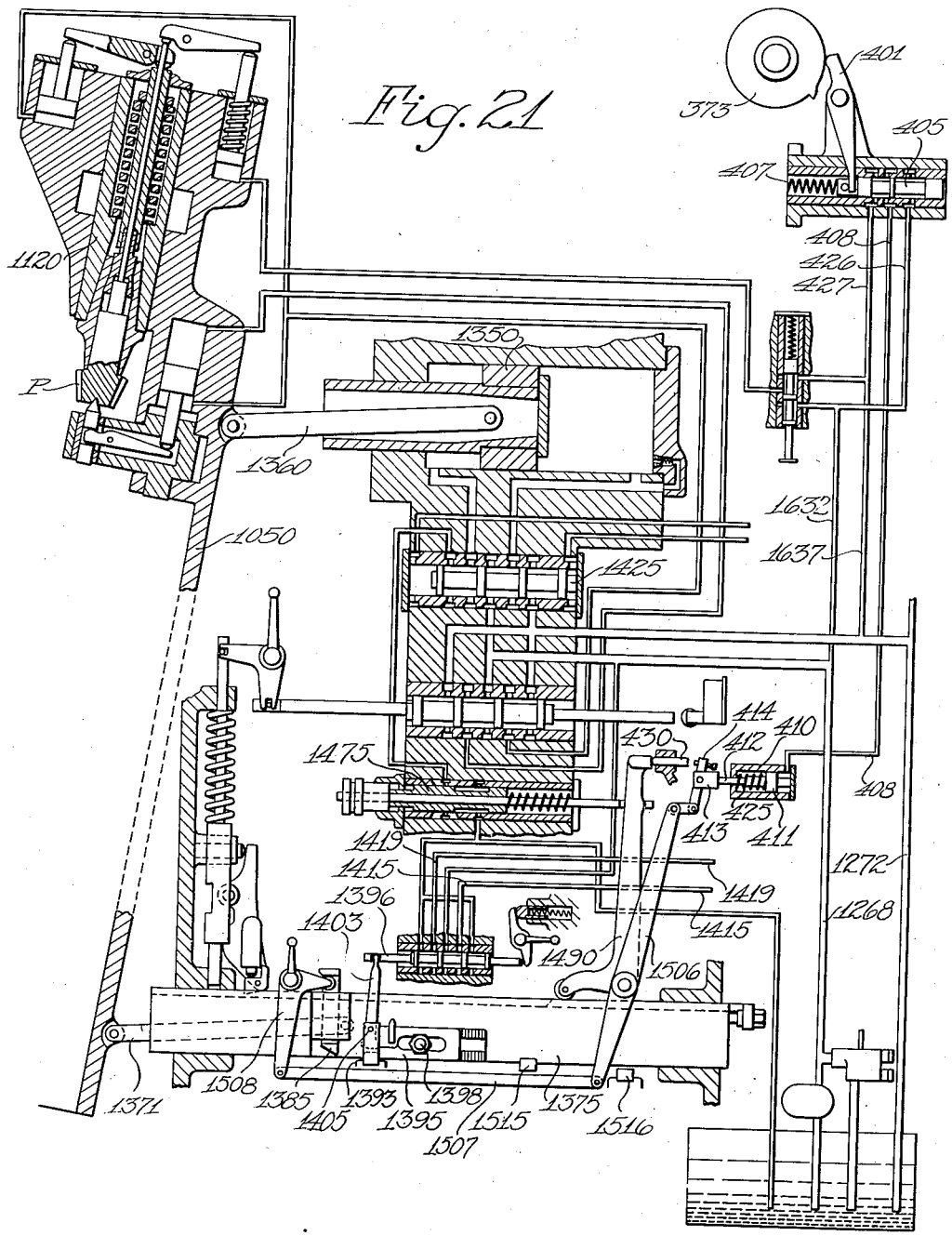

The parts are adjusted initially so that at the beginning of operation of the machine upon a particular gear blank, the roller 390 of the arm 391 will be riding upon the low parts of the peripheries of the cam plates 371 and 372, as shown in Fig. 20 and variation in opening of the throttle valve will be controlled wholly by the cam 1300. The initial position of the cam plates 371 and 372 depends upon the number of tooth spaces in the gear to be cut. The cam plates will be adjusted angularly away from the position shown in Fig. 12 far enough to permit the cutters to slot out all of the tooth spaces of the gear blank before the high part of the peripheral surface of either cam plate comes into contact with the roller 390 in the step-by-step rotary advance of the cam-plates.

In the case of the gears shown in Figs. 18 and 19, the blanks are indexed three times before the cutters begin to operate in a tooth space which has previously been slotted out. In other words, the machine goes through its operating cycle four times in the cutting of either the gear shown in Fig. 18 or of the gear shown in Fig. 19 before the whole generating cycle can be speeded up. The speed-up control mechanism is adjusted initially, therefore, for cutting these gears so that the locking dog 380 will be engaged with the notch 395 (Fig. 12) of the plate 370 and it will be only after the ratchet and pawl mechanism 366—368 has been advanced four times that the parts will arrive in the position shown in Fig. 12 where the roller 390 will ride on the high part of the cam plate 371, to rock the arm 393 to a position where it engages the screw 394 to cause the throttle valve 1260 to be opened fully.

The operation of the mechanism can now be explained in detail. When the reverse valve 1266 is shifted to the right to the position shown in Fig. 20, the piston 350 will be moved to the left from the position shown in Fig. 20 to that shown in Fig. 12. With the valve 1266 in the position shown in Fig. 20, the piston 1170 moves to the left, producing the down roll of the machine and effecting the indexing operation, as already described. As the piston 350 moves to the left, the trip-dog 384 engages the lug 383 of the lever arm 381 but is simply swung idly about its pivot 385 and the parts of the speed-up mechanism are simply reset.

At the end of the return roll, the work is fed into the cutters and when the work has reached operative position, the feed is stopped and then the reverse valve 1266 is shifted to the left from the position shown in Fig. 20 to produce the generating up-roll of the machine. At the same time that the valve 1266 is shifted to the left, pressure-fluid is supplied to the left hand end of the cylinder 351 and exhausted from the right hand end of this cylinder. The piston 350 is moved from the position shown in Fig. 12 to that shown in Fig. 20. In this movement, the trip-dog 385 engages the lug 383 of the lock lever 381, rocking the lock lever about its pivot pin 382 to disengage the locking dog 380 from the notched plate 370. This allows the pawl 366 to engage the ratchet wheel 368 and in the further rightward movement of the piston 350, the rack 360 drives the segment 361 to cause the pawl 366 to rotate the ratchet wheel 368. After the trip dog 384 has moved to the right clear of the lug 383, the lock lever 381 is released, the locking dog 380 drops down onto the periphery of the notched plate 370 and returns into engagement with the next notch of that plate when the next notch has been rotated into registry with the locked dog by rotation of the plate 370 through operation of the ratchet and pawl mechanism 368—366. When the locking dog 380 returns into engagement with the plate 370, the pawl 366 is disengaged from the ratchet wheel by contact of the under-face of the lever arm 381 with the tail of the pawl.

When the generating roll of the machine is completed, the work is withdrawn, the valve 1266 is again shifted to the right to the position shown in Fig. 20 and the return roll of the machine takes place during which the work is indexed as before described. When the valve 1266 is shifted to the right to the position shown in Fig. 20, the right hand end of the cylinder 351 is put on supply and the left hand end of this cylinder on exhaust so that the piston 350 moves back to the left from the position shown in Fig. 20 to that shown in Fig. 12. In this movement, the rack 360 rotates the segment 361 in a clockwise direction, but nothing takes place because the pawl 366 is held out of engagement with the ratchet wheel 368 by engagement of the lever 381 with the tail of the pawl 366.

The alternate step-by-step advance of the ratchet wheel 368 and the resetting of the parts of the speed-up mechanism take place with each generating and return roll until the cam 371 has been advanced to a position where, as shown in Fig. 12, the high part of the periphery of this cam engages the roller 390 to rock the lever 393 into engagement with the screw 394 and depress the throttle valve 1260, opening this valve fully and allowing unthrottled exhaust from the cylinder 1171 in either direction of movement of the piston 1170 so that the generating and return rolls take place at the highest possible speed.

The roller 390 is wide enough so that it can ride on the periphery of either of the cam plates 371 or 372. Hence by adjustment of the cam-plates angularly relative to one another, the angular distance during which the cams are effective to maintain the throttle valve open is determinable.

The movements of the pilot valve 1396 (Fig. 21) which controls the movements of the reverse valve 1266 are controlled, as in the machine of my prior patent, by a pair of stops 1385 and 1395 (Figs. 15 and 21). These stops are carried by a stop-bar 1375 which is connected by a link 1371 with the work head 1050 of the machine. Thus, as the work head 1050 is fed into cutting position or withdrawn therefrom by operation of the piston 1350, the stop-bar 1375 is shifted first in one direction and then in the other. This brings the stops 1385 and 1395 alternately into engagement with the lever 1403 to rock this lever about its pivot 1405 and shift the pilot valve 1396 alternately in opposite directions at opposite ends of the movement of the work head.

The stops 1385 and 1395 also engage alternately with a stop lug 1393 to limit the feed and withdrawal movements of the work. The stop 1395 is adjustable longitudinally on the stop bar 1375 being secured in any adjusted position by the bolt 1398. The stop 1385 is movable transversely of the path of movement of the bar 1375 for movement to and from operative position. The structure and operation of the two stops are identical with the structure and operation of corresponding parts of the machine of my prior application.

When the operation of cutting a blank has been completed, it is desirable to withdraw the work head automatically to loading position so that the completed gear may be removed and a new blank chucked. To do this, the stop 1385 is withdrawn automatically from operative position. Instead of effecting the withdrawal of this stop, however, from an automatic stop mechanism such as in the machine of my prior application, I have found it preferable in the present machine to withdraw this stop automatically through operation of mechanism which is timed to the speed-up mechanism and operates in synchronism with the same. This mechanism will now be described.

Figure 14:
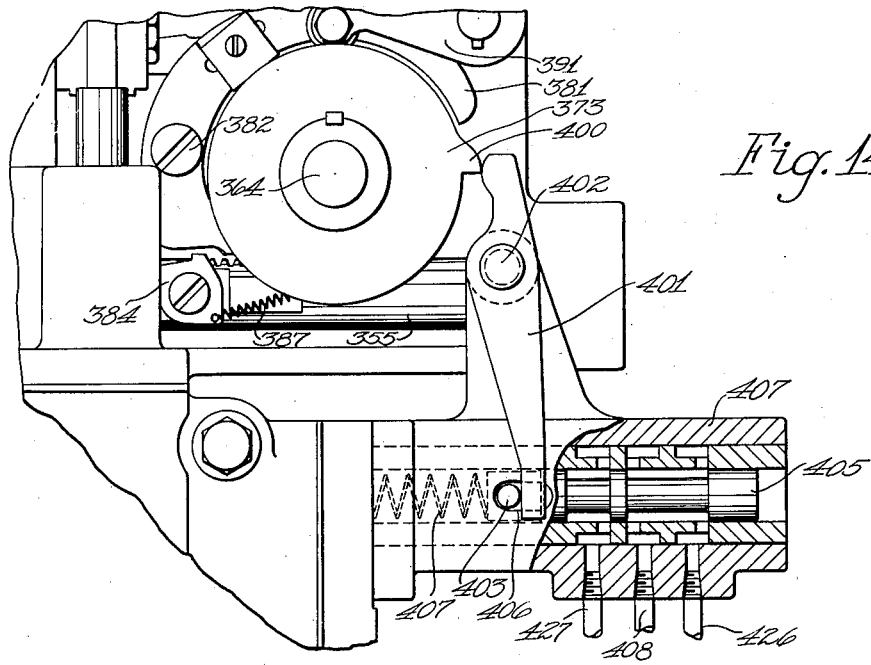
Fig. 14 is a view on a slightly enlarged scale, looking at the end of the shaft which carries the speed control cam and showing the cam which controls the position of the work head and the valve which is operated thereby.

This mechanism includes the cam 373 which is keyed to the shaft 364 (Figs. 13 and 14) and which is advanced step-by-step with the advance of the ratchet wheel 368. This cam is formed with a nose 400 that is adapted, when the cam has been advanced far enough to engage the short arm of a lever 401 (Figs. 14, 20 and 21). This lever is pivoted on the machine at 402 and its long arm engages a pin 403 that projects from one side of a valve 405 through an elongated slot 406 in one side wall of the chamber 407 in which the valve reciprocates.

This valve 405 is continuously urged in one direction by the coil spring 407 and it is moved in the opposite direction against the resistance of the spring by action of the lever 401 when the nose 400 of the cam 373 engages the short arm of this lever. The valve 405 is connected by a duct 408 with a cylinder 410 (Figs. 15 and 21). A piston 411 is reciprocably mounted in this cylinder. It is formed with a piston rod 412 which projects from one end of the cylinder. The piston rod 412 is provided with an enlarged head 413 which is pivotally connected to an arm 414.

The arm 414 is pivoted by means of the pin 415 in a bracket 416 that forms an extension of the cylinder 410. At one end, the arm 414 carries an adjustable stop-screw 417 and at its opposite end it has a pivotal connection by means of the pin 418 with a link 419. The link 419 is pivotally connected by means of the pin 420 with the lever 1506 which is pivotally mounted intermediate its ends upon the work head by means of a pin 1491. The lever 1506 is pivotally connected at its lower end with the link 1507 which in turn is pivotally connected to one arm of a bell-crank lever 1508. The other arm of this bell-crank lever carries a roller 1510 which engages under a ledge or flange 1512 that is formed integral with the stop 1385. When the bell-crank lever 1508 is rocked, then, the stop 1385 is withdrawn from operative position. This permits withdrawal of the work head to loading position and also moves the stop to a point where it will not contact the lever arm 1403 and therefore not reverse the pilot valve 1396.

The rate of the feed and withdrawal movements of the work head are controlled, as in the machine of my prior application by a throttle valve 1475 which is connected by means of the valve stem 1476 with the bell-crank lever 1490. The short arm of this bell-crank lever carries a roller 1492 which is adapted to roll from the bottom of the groove 1494 that is formed on the stop bar 1375 onto the top of the cam-bar 1493 as the bar 1375 moves to the right on the withdrawal movement of the work head 1050. When the roller 1492 is in the position shown in Fig. 15 on the upper face of the cam bar 1493, the throttle valve 1475 will be only partly open so that feed movement of the work head will take place at reduced speed. When the work head is withdrawn, however, for indexing, the roller 1492 rides down off of the cam-bar 1493 into the groove 1494, increasing the opening of the throttle valve so that withdrawal will take place at high speed and the idle time of the machine be reduced to a minimum.

The piston 411 is constantly urged in one direction by the coil-spring 425. Fluid under pressure is supplied to the cylinder 407 of the valve 405 from the ducts 1268, 1632 and 426 (Fig. 21) and the motive fluid is exhausted from the cylinder through the ducts 427, 1637 and 1272.

The cam 373 is adjusted initially relative to the other parts of the machine so that on the next to the last cutting cycle, the nose of this cam will be advanced into engagement with the short arm of the lever 401. This causes the valve 405 to be shifted to the left from the position shown in Fig. 21 to that shown in Fig. 14, This places the line 408 which leads from this valve to the cylinder 410 on supply from the line 426. This causes the piston 411 to be moved to the left against the resistance of the spring 425 and causes the arm 414 to be rocked about the pin 418 (Fig. 15) which connects that arm with the link 419. This brings the stop screw 417 into engagement with a pin or rod 430 that is slidably mounted in the arm 416 and this rod is therefore pushed to the left from the position shown in Fig. 15 for at this time the work head will be in withdrawn position and the roller 1492 will be in the slot 1494 of the bar 1375 and the bell-crank 1490 will be swung counter-clockwise away from the position shown in Fig. 15.

On the last feed movement of the work head, the roller 1492 will ride up out of the slot 1494 on to the top of the cam plate 1493, swinging the bell-crank lever 1490 back to the position shown in Fig. 15. This moves the rod 430 back to the right, but at this time the screw 417 will be held against the right hand end of the rod by the pressure of the motive fluid on the right hand end of the piston 411. The result will be that the arm 414 will be swung clockwise about its pivot pin 415, moving the link 419 to the left to swing the arm 1506 counter-clockwise, moving the link 1507 to the right, and causing the bell-crank 1508 to lift the stop 1385 out of operative position. The result will be that as the bar 1375 moves to the right in the final withdrawal movement, the stop 1385 will not contact the stop lug 1493 or the lever 1403 and the work head will be moved out to loading position where it will remain until the machine is restarted, for the pilot valve 1396 will not be shifted and the cycle of the machine will stop with the work head withdrawn and the cradle at the end of the uproll movement. The withdrawal movement of the work head to loading position will continue until the lug 1515 (Fig. 15) which is carried by the bar 1375 strikes a stop 1516 (Fig. 21).

The operation of the improved machine of the present application will be apparent from the preceding description but may be summed up here. The work is fed into the cutters, then the cutters and work are rolled relative to one another in one direction to effect slotting out of the tooth spaces of the blank and generation of opposite side tooth profiles of the tooth of the blank which is bounded by these tooth spaces, then the work is withdrawn from engagement from the cutters, then the return roll is effected and on this return roll the blank is indexed. The cutters, as previously described, are arranged to cut simultaneously in different tooth spaces of the gear blank. If a gear having an odd number of teeth is to be cut, it will be indexed two tooth spaces at each indexing operation and the ratchet wheels 232 and 233 will not be required because the cam surface 217 of the rail 215 will be used throughout the whole of the cutting of the gear to keep the locking dog 190 withdrawn at each indexing operation for a long enough time to double-index the blank on each indexing operation. If a gear having an even number of teeth is to be cut, ratchet wheels 232 and 233 will be used having a pin 235 which will operate to move the trip dog 220 from operative position initially, or after a predetermined number of indexing operations, as may be desired, so that at some time or times in the operation of cutting such a gear, the blank will be indexed through the distance of a single tooth space instead of through the distance of two tooth spaces. Thus complete taper-cutting of all the tooth spaces of the blank may be effected.

After the cutters have slotted out all the tooth spaces of the blank, further indexing of the blank will result in the cutter C cutting in tooth spaces which have been previously slotted out by the cutter C' and vice versa. Since the two cutters are eccentric of one another, this will mean that in the second cutting operation in the previously slotted out tooth spaces, the tooth spaces will be widened out slightly and tapered.

Since in the second cut around on the different tooth spaces, only a relatively slight amount of stock will need to be removed in order to widen out and taper the previously slotted out tooth spaces, the cutting operation can be speeded up and will be speeded up by the speed-up mechanism of the present invention. This speed-up mechanism is advanced step-by-step for each cutting cycle and when the high parts of the cams 371 and 372 engage the roller 390 (Figs. 12 and 20), which will be determined by the number of indexing operations necessary before all of the tooth spaces have been slotted out, the throttle valve 1260 will be opened to allow the generating roll to be effected at much higher speed than during the slotting out operations on the tooth spaces. As long as the roller 390 rides on the high part of either the cam 371 or the cam 372, the generating roll of the machine will take place at high speed. After the operations upon the blank have been finished, the work head will be moved to loading position and the machine will stop there, the limit stop 1385 being retracted by operation of the cam 373, as above described.

While various features of the invention have been described in connection with a machine for generating gears, it will be understood that the invention in many respects is applicable also to the cutting of gears in a forming or non-generating operation. Likewise, also, the invention is not restricted to the production of longitudinally curved tooth gears but in many aspects applies also to the production of straight tooth gears, whether spur or bevel. This application is intended to cover any variations, uses, or adaptations of the invention following, in general, the principles of the invention and including departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a machine for cutting gears, a pair of eccentrically mounted face-mill gear cutters arranged to operate simultaneously in two adjacent tooth spaces of a gear blank, means for rotating the cutters in engagement with a gear blank, and means for periodically indexing the blank through an even number of tooth spaces of the blank.

2. In a machine for cutting gears, a pair of eccentrically mounted face-mill gear cutters arranged to operate simultaneously in two adjacent tooth spaces of a gear blank, means for rotating the cutters in engagement with a gear blank, means for periodically indexing the blank, and means operable to control the indexing mechanism so that the blank is indexed through the angular distance of two tooth spaces a predetermined number of times and through the angular distance of one tooth space a predetermined number of times in the cutting of a given blank.

3. The method of cutting a gear which comprises employing a pair of eccentrically mounted face-mill gear cutters, mounting the cutters in engagement with a gear blank so that they will operate simultaneously upon two different tooth spaces of the blank, rotating the cutters in engagement with the blank and indexing the blank periodically through the angular distance of a plurality of tooth spaces of the blank.

4. The method of cutting a gear which comprises employing a pair of eccentrically mounted face-mill gear cutters, arranging the cutters in engagement with the gear blank so that they will operate simultaneously in two different tooth spaces of the blank, rotating the cutters in engagement with the blank, and indexing the blank periodically in such way that the blank is indexed intermittently through the angular distance of two tooth spaces of the blank and through the angular distance of a single tooth space of the blank.

5. The method of cutting a gear which is to have an even number of teeth when finished, which comprises employing a pair of eccentrically mounted face-mill gear cutters, mounting the cutters in engagement with a gear blank so that they will operate simultaneously in two different tooth spaces of the blank, rotating the cutters in engagement with the blank, and indexing the blank periodically through the angular distance of two tooth spaces of the blank until slots have been cut in all of the tooth spaces of the blank, then indexing the blank once through the angular distance of one tooth space of the blank, and then indexing the blank again periodically through the angular distance of two tooth spaces until the blank has been indexed through two revolutions.

6. The method of cutting a gear which is to have an odd number of teeth when finished, which comprises employing a pair of eccentrically mounted face-mill gear cutters, mounting the cutters in engagement with a gear blank so that they will operate simultaneously in two different tooth spaces of the blank, rotating the cutters in engagement with the blank, and indexing the blank periodically through the angular distance of two tooth spaces of the blank until the blank has been indexed through two revolutions.

7. The method of cutting a gear which comprises employing a pair of eccentrically mounted face-mill gear cutters, arranging said cutters to operate simultaneously in two different tooth spaces of a gear blank and indexing the blank intermittently so that slots will be cut first in all the tooth spaces of the gear and then each cutter will operate in a tooth space previously operated upon by the other cutter to widen out and taper-cut that tooth space.

8. In a gear cutting machine, a pair of eccentrically mounted gear cutters arranged to operate simultaneously in two different tooth spaces of a gear blank, means for rotating the cutters in engagement with the blank, means for indexing the blank periodically so that slots will be cut first in all the tooth spaces of the blank, and then each cutter will operate in a tooth space previously operated upon by the other cutter to taper-cut the same, and means controlling the speed of the cutting operation so that after slots have been cut in all the tooth spaces, the cutting operation will be accelerated so that the second cutting operation in each tooth space will take place at increased speed.

9. In a gear cutting machine, a pair of eccentrically mounted gear cutters arranged to operate simultaneously in two different tooth spaces of a gear blank, means for rotating the cutters in engagement with the blank, means for simultaneously producing a relative rolling movement between the cutters and blank, means for indexing the blank periodically, and means for controlling said indexing mechanism so that slots will be cut first in all the tooth spaces of the blank and then each cutter will operate in a tooth space previously slotted out by the other cutter, and means for accelerating the rolling movement on the second cutting operation in each tooth space.

10. In a gear cutting machine, a work support, a pair of eccentrically mounted face-mill gear cutters, means for adjusting one of the cutters axially independently of the other, and separate means for adjusting the two cutters simultaneously together axially.

11. In a gear cutting machine, a pair of eccentrically mounted face-mill gear cutters, a drive member, means for securing one of the cutters to the drive member to rotate therewith, a roller secured to the drive member, a plate connected to the other cutter and having a slot therein which extends radially of the axis of the second cutter and in which said roller engages to drive the second cutter upon rotation of said drive member, means for rotating said drive member, and means for adjusting the distance between said cutters at the point of cut.

12. In a gear cutting machine, a pair of eccentrically mounted face-mill gear cutters, a drive member, means for securing one of the cutters to the drive member to rotate therewith, a plate connected directly to the other cutter and having a bearing surface concentric to the axis of this second cutter, a rotary member journaled on said bearing surface and having its peripheral surface concentric to the axis of the first cutter and having an internal surface concentric to the axis of the second cutter, means for rotating said member to adjust the distance between said cutters, at the point of cut and means connecting said drive member and plate to drive the second cutter on rotation of said drive member.

13. In a machine for producing gears, a pair of tools adapted to operate simultaneously in two different tooth spaces of a gear blank, means for actuating the tools, fluid-pressure operated means for producing a relative rolling movement between the tools and the blank, a throttle valve controlling the rate of rolling movement, means for periodically indexing the blank, means for controlling said indexing means so that slots are first cut in all the tooth spaces of the blank and then each tool operates in a tooth space previously slotted out by the other tool, and means for increasing the opening of the throttle valve after the tooth spaces have been slotted out so that the rolling movement takes place at an increased rate during the second cutting operation in the tooth spaces.

14. In a machine for producing gears, a work support, cutting mechanism, means for actuating the cutting mechanism, means for controlling the operation of the machine so that slots of uniform width from end to end are first cut in all the tooth spaces of a gear blank and then these slots are recut so as to taper them in width from end to end, means adapted to be advanced step-by-step on each cutting operation upon each tooth space adapted to accelerate the cutting operation when all of the tooth spaces have been slotted out, and means operatively connected to the last named means adapted to cause automatic withdrawal of the work support to loading position when the cutting operations on all of the tooth spaces have been completed.

15. In a machine for producing gears, a work support, a pair of tools arranged to operate simultaneously in two adjacent tooth spaces of a gear blank, means for actuating the tools, means for indexing the blank periodically, and means operable to control the indexing mechanism so that at different stages in the production of a blank, the blank will be indexed through the angular distance of one tooth space and of a plurality of tooth spaces.

16. In a machine for producing gears, a pair of tools arranged to operate simultaneously in two different tooth spaces of a gear blank, means for actuating the tools, means for producing a relative rolling movement between the tools and blank during operation of the tools, means controlling the operation of the machine so that the tools first operate in all the tooth spaces of a gear blank and then each operates in a tooth space in which the other tool has previously operated, and means controlling the rate of the rolling motion so that this motion takes place at a more rapid rate when a tool is operating in a tooth space previously operated upon by the other tool.

17. In a machine for producing gears, a pair of tools arranged to operate simultaneously in two different tooth spaces of a gear blank, means for actuating the tools, means for producing a relative rolling movement between the tools and blank during operation of the tools, means for indexing the blank periodically so that the tools will operate first in all the tooth spaces of the blank and then each tool will operate in a tooth space previously operated upon by the other tool, and means controlling the rate of rolling movement so that the rolling motion takes place at a more rapid rate when a tool is operating in a tooth space previously operated upon by the other tool.

18. In a gear cutting machine, a pair of eccentrically mounted face-mill gear cutters, a spindle to which one of said cutters is secured, a sleeve in which said spindle is secured to rotate therein with and on which the other cutter is mounted, a support in which said sleeve is journaled, means for adjusting the spindle axially in the sleeve, and means for adjusting the sleeve in said support axially of said spindle.

19. In a gear cutting machine, a pair of eccentrically mounted face-mill gear cutters, a spindle to which one of said cutters is secured, a sleeve in which said spindle is secured to rotate therein with and on which the other cutter is mounted, a support in which said sleeve is journaled, means for adjusting the spindle axially in said sleeve, means for adjusting the sleeve in said support axially of the spindle, means for rotating the sleeve to drive the first cutter, and means for rotating the other cutter on rotation of said sleeve.

20. In a gear cutting machine, a pair of tools arranged to operate simultaneously in two different tooth spaces of a gear blank, means for actuating the tools, means controlling the cutting operation so that the tools first cut in all the tooth spaces of a gear blank and then each cuts in a tooth space in which the other tool has previously operated, means for producing a relative rolling movement between the tools and work during cutting, and means adapted to be advanced step-by-step with the rolling movement to accelerate the speed of the rolling movement after the tools have completed their first cuts in the tooth spaces.

21. The method of producing a gear which comprises employing a pair of tools, arranging said tools so that when actuated they move across the face of the gear blank in paths inclined longitudinally to one another and so that they operate simultaneously in two different tooth spaces of a gear blank, and controlling the movements of the tools and blank so that the tools first cut in all the tooth spaces of the blank to produce slots of uniform width, and then each tool operates in a tooth space previously operated upon by the other tool to widen out that tooth space and produce a tooth space which tapers in width from end to end.

22. In a machine for producing gears, tool mechanism, a work support, means for actuating the tool mechanism, means for producing relative rolling movements between the tool mechanism and the work support, means for indexing the work support once for each rolling movement, and means operable after a predetermined number of rolling movements to vary the rate of the rolling movement.

23. In a machine for producing gears, tool mechanism, a work support, means for producing relative rolling movements between the tool mechanism and the work support, means for indexing the work support once for each rolling movement, means for varying the rate of the rolling movement during production of a gear, and separate means for varying the rate of the rolling movement during cutting of each tooth space of the gear.

24. In a machine for producing gears, tool mechanism, a work support, fluid pressure operated means for producing relative rolling movements between the tool mechanism and the work support, a throttle valve for controlling the rate of the rolling movements, and means operable after a predetermined number of rolling movements to vary the opening of the throttle valve.

25. In a machine for producing gears, tool mechanism, a work support, fluid pressure operated means for producing a relative rolling movement between the tool mechanism and the work support, a throttle valve for controlling the rate of the rolling movement, means for periodically indexing the work support, means operable after predetermined number of rolling movements to vary the opening of the throttle valve, and separate means operable on each rolling movement for varying the opening of said throttle valve.

LEONARD O. CARLSEN.